US012011885B2

United States Patent
Ward

(10) Patent No.: US 12,011,885 B2
(45) Date of Patent: Jun. 18, 2024

(54) SYSTEMS AND METHODS FOR THERMOPLASTIC PANEL STRETCH/ROLL FORMING

(71) Applicant: ROHR, INC., Chula Vista, CA (US)

(72) Inventor: Stephen Harold Ward, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/987,309

(22) Filed: Nov. 15, 2022

(65) Prior Publication Data
US 2023/0073068 A1 Mar. 9, 2023

Related U.S. Application Data

(62) Division of application No. 16/779,793, filed on Feb. 3, 2020, now Pat. No. 11,524,468.

(51) Int. Cl.
*B29C 70/30* (2006.01)
*B29C 51/14* (2006.01)
(Continued)

(52) U.S. Cl.
CPC ............ *B29C 70/34* (2013.01); *B29C 51/145* (2013.01); *B29C 51/22* (2013.01); *B29C 51/42* (2013.01); *B29C 70/32* (2013.01); *B29C 70/38* (2013.01); *B29C 70/504* (2013.01); *B29C 2791/004* (2013.01)

(58) Field of Classification Search
CPC ......... B29C 70/32; B29C 53/66; B29C 53/60; B29C 53/56; B29C 53/825; B29C 70/384; B29C 70/388
See application file for complete search history.

(56) References Cited

U.S. PATENT DOCUMENTS 3,300,355 A * 1/1967 Adams .................. B29C 70/386
156/196
4,750,965 A * 6/1988 Pippel .................... G05B 19/41
156/577
(Continued)

OTHER PUBLICATIONS

European Patent Office, European Search Report dated Jun. 18, 2021 in Application No. 21154759.1.
(Continued)

*Primary Examiner* — Matthew J Daniels
(74) *Attorney, Agent, or Firm* — SNELL & WILMER L.L.P.

(57) ABSTRACT

A thermoforming method includes forming a skin comprising a plurality of plies thermoplastic resin and fiber, securing an edge of the skin to a mandrel, heating, via a heating element, the skin to a forming temperature, moving a thermoforming apparatus with respect to the mandrel, rolling at least one roller of the thermoforming apparatus along the skin in a direction away from the clamped edge of the skin in response to the thermoforming apparatus moving with respect to the mandrel, and in response to the at least one roller of the thermoforming apparatus rolling along the skin, compressing the skin between the at least one roller and the mandrel, consolidating the plurality of plies of material, and bending the skin to conform to a shape of the mandrel. The consolidated and formed skin is then cooled and removed from the mandrel.

10 Claims, 4 Drawing Sheets

(51) Int. Cl.
  *B29C 51/22* (2006.01)
  *B29C 51/42* (2006.01)
  *B29C 70/32* (2006.01)
  *B29C 70/34* (2006.01)
  *B29C 70/38* (2006.01)
  *B29C 70/50* (2006.01)

(56) References Cited

U.S. PATENT DOCUMENTS

| | | | |
|---|---|---|---|
| 4,818,460 A | 4/1989 | Nied | |
| 4,838,974 A | 6/1989 | Nied et al. | |
| 4,938,824 A | 7/1990 | Youngkeit | |
| 4,992,133 A | 2/1991 | Border | |
| 4,997,508 A * | 3/1991 | Shinno | B29C 70/388 156/574 |
| 5,015,326 A * | 5/1991 | Frank | B29C 70/388 156/519 |
| 5,177,340 A | 1/1993 | Zaffiro | |
| 5,891,379 A | 4/1999 | Bhattacharyya et al. | |
| 6,162,314 A * | 12/2000 | Kassuelke | B29C 70/46 156/266 |
| 6,613,258 B1 | 9/2003 | Maison et al. | |
| 6,941,632 B1 * | 9/2005 | Mead | B29C 70/342 29/81.03 |
| 7,993,124 B2 * | 8/2011 | Nelson | B29C 70/38 219/539 |
| 8,226,787 B2 | 7/2012 | Benson et al. | |
| 9,707,726 B2 | 7/2017 | Reinhold et al. | |
| 2002/0056788 A1 | 5/2002 | Anderson et al. | |
| 2005/0023728 A1 | 2/2005 | Benson et al. | |
| 2005/0056362 A1 * | 3/2005 | Benson | B29C 70/388 156/229 |
| 2012/0186743 A1 | 7/2012 | Holloway | |
| 2014/0283977 A1 * | 9/2014 | Mathon | B29C 53/821 156/169 |
| 2015/0041048 A1 | 2/2015 | Anderson et al. | |
| 2016/0332394 A1 * | 11/2016 | Chapman | B29C 70/384 |
| 2017/0173864 A1 | 6/2017 | Linde | |
| 2019/0016040 A1 | 1/2019 | Robins et al. | |
| 2019/0277141 A1 | 9/2019 | Gill | |
| 2019/0291372 A1 | 9/2019 | Albert et al. | |

OTHER PUBLICATIONS

USPTO; Requirement for Restriction dated Nov. 18, 2021 in U.S. Appl. No. 16/779,793.

USPTO; Preinterview Office Action dated Jan. 31, 2022 in U.S. Appl. No. 16/779,793.

USPTO; First Action Interview Office Action dated Apr. 6, 2022 in U.S. Appl. No. 16/779,793.

USPTO; Notice of Allowance dated Aug. 16, 2022 in U.S. Appl. No. 16/779,793.

European Patent Office, European Search Report dated May 2, 2023 in Application No. 23154771.2.

* cited by examiner

SYSTEMS AND METHODS FOR THERMOPLASTIC PANEL STRETCH/ROLL FORMING

CROSS-REFERENCE TO RELATED APPLICATIONS

This application claims priority to, the benefit of, and is a divisional of U.S. patent application Ser. No. 16/779,793, filed on Feb. 3, 2020, and entitled "SYSTEMS AND METHODS FOR THERMOPLASTIC PANEL STRETCH/ROLL FORMING," which is incorporated by reference herein in its entirety for all purposes.

FIELD

The present disclosure relates generally to thermoplastics manufacturing, and more specifically to roll forming of fiber-reinforced thermoplastic materials.

BACKGROUND

Various industries include components having multi-dimensional panels for various uses. For example, the aerospace industry utilizes nacelles for various applications for providing a protective housing around adjacent components as well as for providing an aerodynamic surface for reducing drag, among other applications. For example, a fan cowl is used for covering various components of a turbine engine and provides an aerodynamic surface for the turbine engine and related systems. A fan cowl outer skin is typically made from metal or carbon fiber thermoset composites. A current method of forming skins and/or stiffeners includes laying up thermoset composite plies by hand, one at a time, to form a laminate structure, representing a time consuming process.

SUMMARY

A method for forming a thermoplastic panel is disclosed, comprising tacking together a plurality of plies of material comprising thermoplastic resin and fiber to form a skin, the plurality of plies of material are tacked together over a substantially planar surface, clamping an edge of the skin to a mandrel, heating, via a heating element, the skin to a forming temperature, moving a thermoforming apparatus with respect to the mandrel, rolling at least one roller of the thermoforming apparatus along the skin in a direction away from the clamped edge of the skin in response to the thermoforming apparatus moving with respect to the mandrel, and in response to the at least one roller of the thermoforming apparatus rolling along the skin, compressing the skin between the at least one roller and the mandrel, consolidating the plurality of plies of material, and bending the skin to conform to a shape of the mandrel, and cooling the skin after consolidating and conforming the skin to the mandrel to a temperature below a recrystallization temperature of the thermoplastic resin.

In various embodiments, when the thermoplastic resin comprises a crystalline structure, the forming temperature is greater than a recrystallization temperature of the thermoplastic resin. In various embodiments, when the thermoplastic resin comprises an amorphous structure, the forming temperature is greater than a glass transition temperature of the thermoplastic resin.

In various embodiments, the at least one roller and the heating element are coupled to the thermoforming apparatus, the at least one roller and the heating element move together with the thermoforming apparatus.

In various embodiments, the thermoforming apparatus is moved along a track system with respect to the mandrel.

In various embodiments, in response to the thermoforming apparatus moving with respect to the mandrel, a trajectory of the thermoforming apparatus conforms to the shape of the mandrel.

In various embodiments, the at least one roller is compressed against the skin via a spring member.

In various embodiments, the method further comprises disposing a second plurality of plies of material comprising thermoplastic resin and fiber to form a stiffener feature in a channel disposed in the mandrel.

In various embodiments, the method further comprises heating, via the heating element, the stiffener feature to the forming temperature.

In various embodiments, the method further comprises compressing, via the at least one roller, the stiffener feature between the skin and the mandrel in response to the at least one roller of the thermoforming apparatus being rolled along the skin, wherein the stiffener feature and the skin are consolidated together in response to being compressed by the at least one roller.

A method for forming a thermoplastic panel is disclosed, comprising coupling an edge of a skin to a mandrel exhibiting a substantially convex geometry, the skin comprises a plurality of plies of material, heating, via a first heating element, the skin to a forming temperature, moving a thermoforming apparatus with respect to the mandrel, rolling a first row of rollers of the thermoforming apparatus along the skin in a direction away from the clamped edge of the skin in response to the thermoforming apparatus moving with respect to the mandrel, rolling a second row of rollers of the thermoforming apparatus along the skin in the direction away from the clamped edge of the skin in response to the thermoforming apparatus moving with respect to the mandrel, the first row of rollers is offset from the second row of rollers, compressing, via a first spring member, the skin between the first row of rollers and the mandrel in response to the thermoforming apparatus moving with respect to the mandrel, thereby consolidating the plurality of plies of material and causing the skin to conform to a shape of the mandrel, compressing, via a second spring member, the skin between the second row of rollers and the mandrel in response to the thermoforming apparatus moving with respect to the mandrel, thereby consolidating the plurality of plies of material and causing the skin to conform to the shape of the mandrel, and cooling the skin after consolidating and conforming the skin to the mandrel to a temperature below a recrystallization temperature.

In various embodiments, the method further comprises disposing a second plurality of plies of material in a channel disposed in the mandrel to form a stiffener feature.

In various embodiments, the method further comprises heating, via at least one of the first heating element and a second heating element, the stiffener feature to the forming temperature.

In various embodiments, the method further comprises compressing, via the first spring member, the stiffener feature between the first row of rollers and the mandrel in response to the thermoforming apparatus moving with respect to the mandrel, thereby consolidating the second plurality of plies of material of the stiffener feature and causing the stiffener feature to conform to the shape of the channel, compressing, via the second spring member, the stiffener feature between the second row of rollers and the mandrel in response to the thermoforming apparatus moving with respect to the mandrel, thereby consolidating the second plurality of plies of material of stiffener feature and causing the stiffener feature to conform to the shape of the channel, and cooling the stiffener feature after consolidating and conforming the stiffener feature to the mandrel to the temperature below the recrystallization temperature, wherein the stiffener feature and the skin are consolidated together in response to being compressed by the first row of rollers and the second row of rollers.

A thermoforming apparatus for forming a thermoplastic panel is disclosed, comprising a mandrel exhibiting a substantially convex geometry, a frame structure moveable with respect to the mandrel, a first row of rollers exhibiting a geometry configured to at least partially complementarily engage the mandrel as it rolls there along, the first row of rollers coupled with the frame structure, a second row of rollers exhibiting a geometry configured to at least partially complementarily engage the mandrel as it rolls there along, the second row of rollers coupled with the frame structure, a first spring member configured to apply a first desired force to the mandrel through the first row of rollers, a second spring member configured to apply a second desired force to the mandrel through the first row of rollers, and a first heating element coupled with the frame structure.

In various embodiments, the first heating element is configured to heat a first surface of a plurality of plies of material.

In various embodiments, the thermoforming apparatus further comprises a second heating element coupled with the frame structure.

In various embodiments, the second heating element is configured to heat a second surface of the plurality of plies of material.

In various embodiments, the thermoforming apparatus further comprises a channel disposed in the mandrel, the channel configured to receive a second plurality of plies of material.

In various embodiments, the second row of rollers is offset from the first row of rollers.

In various embodiments, the first row of rollers and the first heating element are configured to move together with the frame structure with respect to the mandrel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Throughout this specification, reference is made to "melting temperature" and "recrystallization temperature" in respect of thermoplastics. It is understood that the terms are defined as follows:

"Melting temperature" is the temperature range at which the plastic undergoes a phase change from a solid to liquid, upon heating.

"Recrystallization temperature" is the temperature at which the semi-crystalline or crystalline matrix begins to form crystals upon cooling from the molten amorphous state. The onset of re-crystallization from the molten state takes place over a temperature "window-range", which is dependent on the rate of cooling and the final achievable degree of crystallinity of the polymer matrix.

The thermoplastic panel roll forming process, as described herein, may provide a relatively quick manufacturing process, e.g., on the order of minutes, of a thermoplastic panel, such as the outer skin for a stiffened panel. The thermoplastic panel roll forming process, as described herein, may provide a manufacturing process for transforming a flat thermoplastic panel into a relatively complex geometry, while minimizing, or eliminating, wrinkling.

Figure 1A:
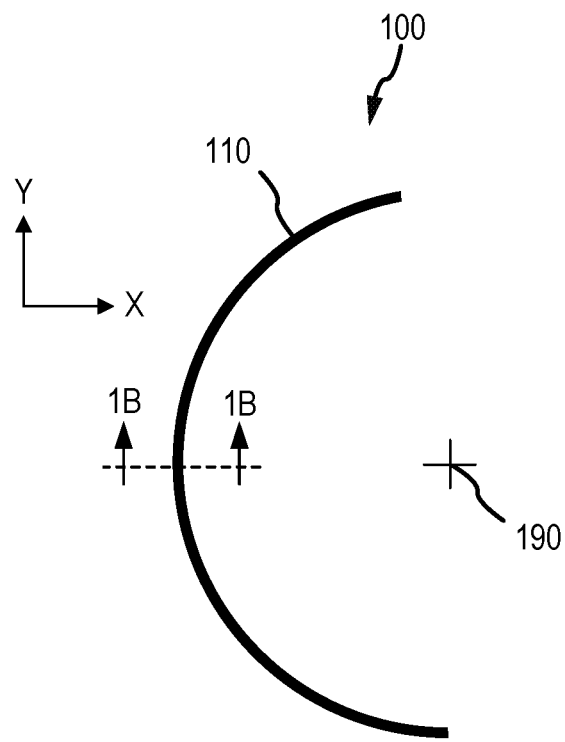
FIG. 1A illustrates a front-view profile of a stiffened panel half (such as for an aircraft nacelle fan cowl) having a semi-cylindrical geometry, in accordance with various embodiments.

With reference to FIG. 1A, a stiffened panel half 100 is illustrated, in accordance with various embodiments. Stiffened panel half 100 may comprise an outer skin 102. Outer skin 110 may comprise a semi-cylindrical geometry when viewed from the aft direction, as shown in the illustrated embodiment. Outer skin 110 may define a centerline axis 190. Stated differently, outer skin 110 may be bent around centerline axis 190.

Figure 1B:
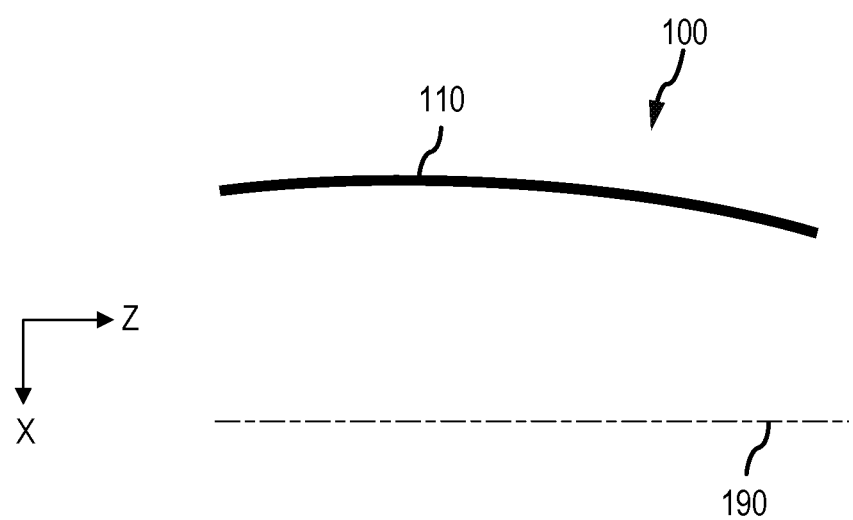
FIG. 1B illustrates a section view of the panel half of FIG. 1A having a rounded geometry, in accordance with various embodiments.

With reference to FIG. 1B, a section view of stiffened panel half 100 is illustrated, in accordance with various embodiments. Outer skin 110 may be contoured along the longitudinal direction (i.e., the Z-direction). Stated differently, outer skin 110 may comprise a non-linear geometry (e.g., rounded) along the longitudinal direction.

Outer skin 110 may be made from a fiber-reinforced thermoplastic material. In various embodiments, the outer skin 110 comprises a continuous reinforcing fiber and a thermoplastic resin. The reinforcing fiber to be used for the outer skin 110 has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the outer skin 110 may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAD, polyetherimide (PEI), polysulfone (PSU), polyether sulfone (PES), and polyarylate (PAR). The thermoplastic resin to be used for the outer skin 110 also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Figure 2:
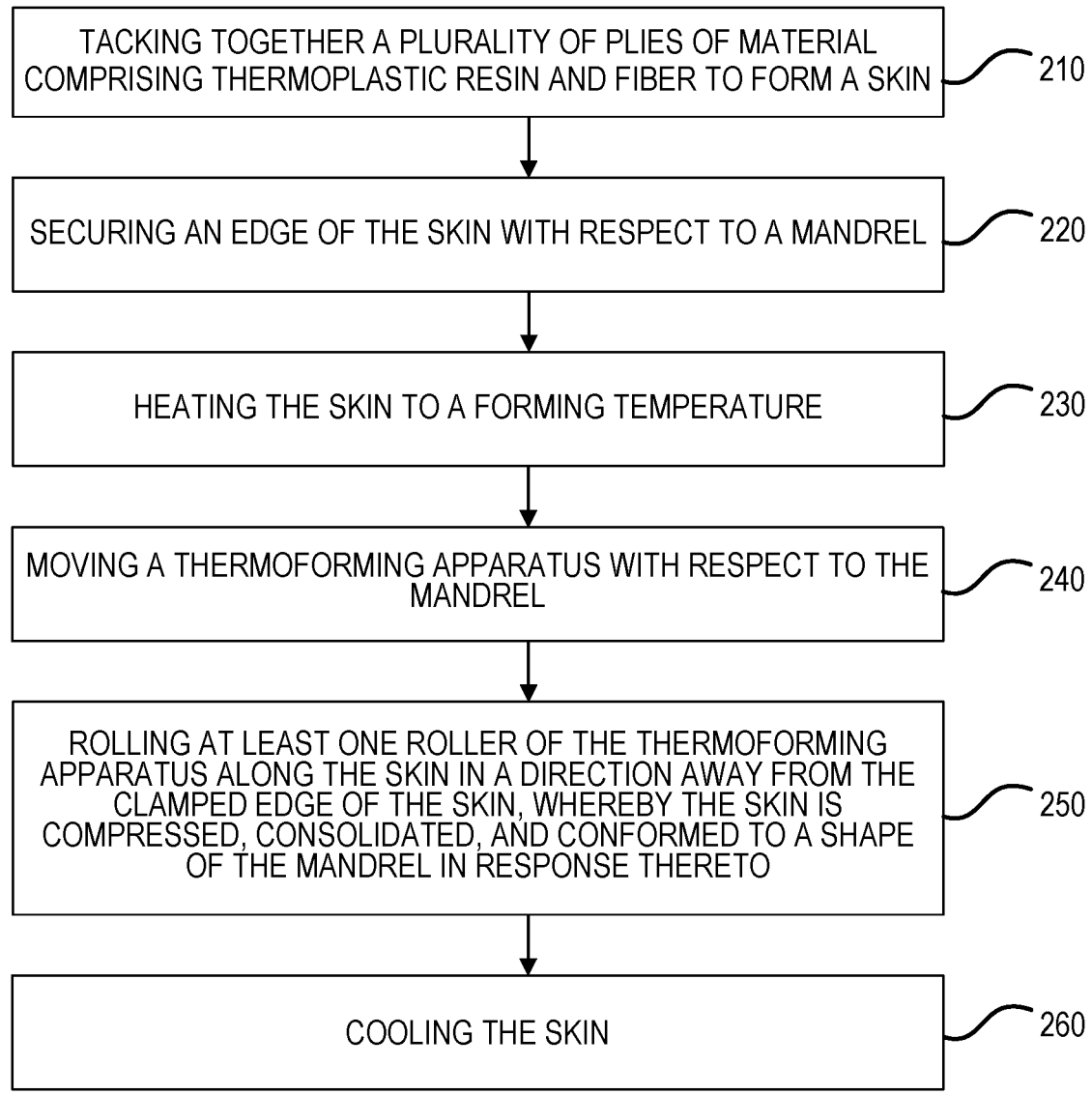
FIG. 2 provides a flow chart for a method for manufacturing a fiber-reinforced thermoplastic panel, in accordance with various embodiments.

With reference to FIG. 2, a method 200 for manufacturing a thermoplastic panel is provided, in accordance with various embodiments. Method 200 includes tacking together a plurality of plies of material comprising thermoplastic resin and fiber to form a skin (step 210). Method 200 includes securing an edge of the skin with respect to a mandrel (step 220). Method 200 includes heating the skin to a forming temperature (step 230). Method 200 includes moving a thermoforming apparatus with respect to the mandrel (step 240). Method 200 includes rolling at least one roller of the thermoforming apparatus along the skin in a direction away from the clamped edge of the skin, whereby the skin is compressed, consolidated, and conformed to a shape of the mandrel in response thereto (step 250). Method 200 includes cooling the skin (step 260).

Figure 3:
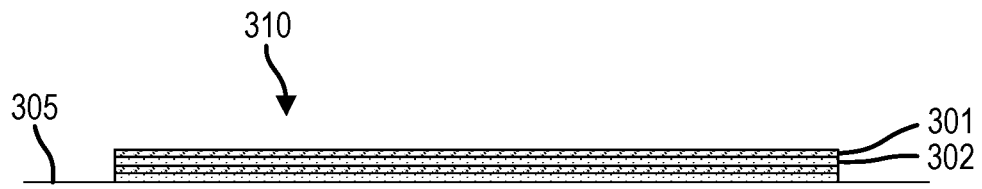
FIG. 3 and FIG. 4A illustrate various steps of the manufacturing process of FIG. 2, in accordance with various embodiments.

With combined reference to FIG. 2 and FIG. 3, step 210 may include stacking plies of fiber sheets 301 and thermoplastic resin sheets 302 to a desired thickness to form a skin preform 310 (also referred to herein as a skin). In various embodiments, and for ease of handling, the sheets may be stacked on a substantially planar surface 305. In various embodiments, the resin sheets 302 may be "tacky" at a room temperature. Therefore, the resin sheets 302 may be "tacked" or stick to adjacent fiber sheets 301 without adding additional heat. However, in various embodiments, local heat may be applied to tack the resin sheets 302 and fiber sheets 301 together to form a flat sheet of material. Various methods may be used to tack together the stack of sheets to hold the sheets in place with respect to each other without departing from the scope of the present disclosure, such as clamping and ultrasonic welding, among others. Furthermore, any number of plies of fiber sheets 301 and/or resin sheets 302 may be used depending on the desired thickness of the fiber-reinforced thermoplastic panel. Furthermore, the thickness of the panel may vary. In this regard, a first location of the panel may have a first number of plies and a second location of the panel may have a second number of plies, different from the first number of plies. After the skin preform 310 has been formed, the skin preform 310 may be transferred to a mandrel 320 (see FIG. 4A).

Figure 4A:
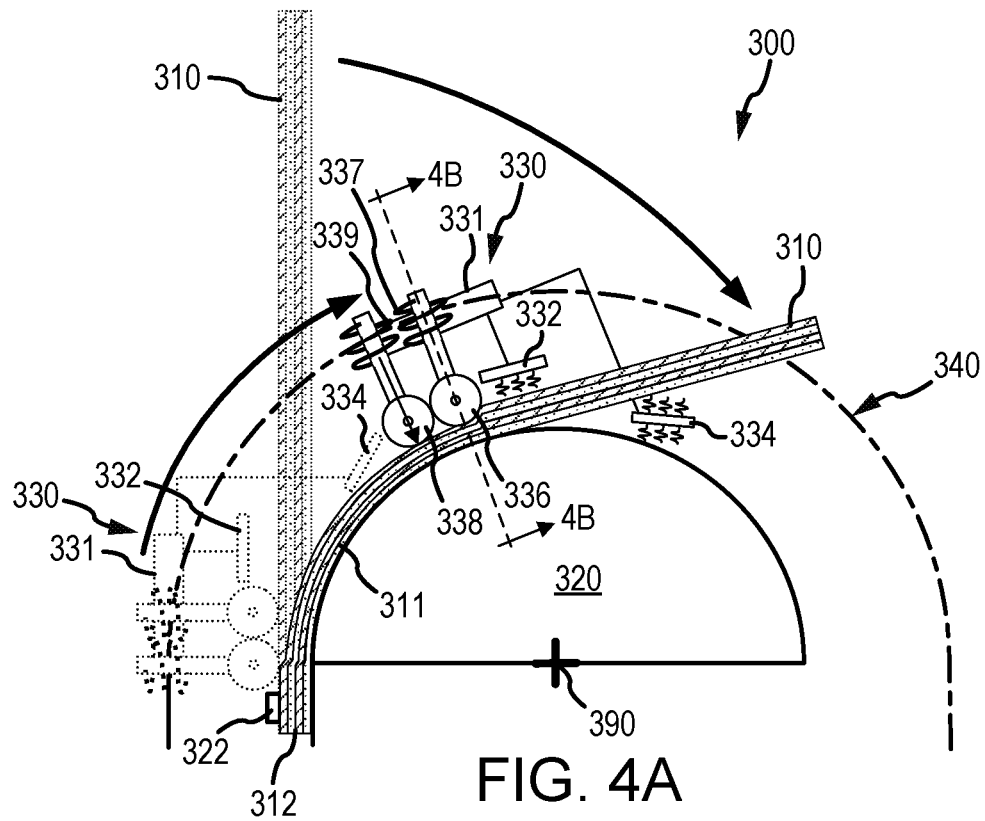

With combined reference to FIG. 2 and FIG. 4A, step 220 may include securing an edge 312 of the skin preform 310 with respect to mandrel 320. In this manner, edge 312 of skin preform 310 may be fixed with respect to mandrel 320 to secure skin preform 310 in place for roll forming. In various embodiments, edge 312 of skin preform 310 in secured in place by clamping, via clamp 322, edge 312 to mandrel 320.

With combined reference to FIG. 2 and FIG. 4A, step 230 may include heating, via one or more heating elements (e.g., heating element 332 and/or heating element 334), the skin preform 310 to a forming temperature. Skin preform 310 may be locally heated to a sufficient forming temperature such that the skin preform 310 becomes pliable for roll forming purposes. In various embodiments, the term "forming temperature" as used herein may refer to a range of temperatures which is greater than the recrystallization temperature (or glass transition temperature for amorphous thermoplastic resins) of the thermoplastic resin of skin preform 310. The suitable pliable forming temperature may vary depending on the particular thermoplastic material being used, as well as other factors, such as the thickness of the panel. In various embodiments, the forming temperature is a temperature below the melting temperature, but not less than the recrystallization temperature (or glass transition temperature for amorphous thermoplastic resins) of the thermoplastic. In various embodiments, the forming temperature is a temperature above the melting temperature of the thermoplastic.

With combined reference to FIG. 2 and FIG. 4A, step 240 may include moving a thermoforming apparatus 330 with respect to the mandrel 320. Thermoforming apparatus 330 may comprise a structural frame 331, heating element 332, heating element 334, first row of rollers 336, and second row of rollers 338. Heating element 332, heating element 334, first row of rollers 336, and second row of rollers 338 may be mounted to structural frame 331. Structural frame 331 may be mounted to a track system 340 whereupon thermoforming apparatus 330 is operatively coupled for moving thermoforming apparatus 330 with respect to mandrel 320 for roll forming the skin preform 310. In various embodiments, structural frame 331 is made from a metal material. The dashed line at 340 also represents a trajectory of thermoforming apparatus 330. This trajectory may conform to the profile of mandrel 320. In this regard, step 240 may include moving thermoforming apparatus 330 along track system 340 with respect to the mandrel 320. In various embodiments, thermoforming apparatus 330 is moved using an automated system. In this regard, an automated system may further include a controller, electric motors, and/or other system components for moving thermoforming apparatus 330 along track system 340. However, in accordance with various embodiments, thermoforming apparatus 330, may be moved manually by hand.

In various embodiments, track system 340 may conform to the shape of a contact surface of mandrel 320. In this manner, thermoforming apparatus 330 may follow the profile of mandrel 320 as the thermoforming apparatus 330 is moved along the track system 340. Mandrel 320 may exhibit a substantially convex geometry. In this regard, track system 340 may similarly exhibit a substantially convex geometry.

In response to thermoforming apparatus 330 moving with respect to the mandrel 320, at least one roller may roll along skin preform 310 to form skin preform 310 against mandrel 320. In this regard, step 250 may include rolling the first row of rollers 336 and the second row of rollers 338 along skin preform 310. The first row of rollers 336 and the second row of rollers 338 may start at or near the clamped edge 312 of skin preform 310 and roll along skin preform 310 in a direction away from the clamped edge 312. With skin preform 310 locally heated by heating element 332 and/or heating element 334 to a temperature below the melting temperature of the thermoplastic resin, the skin preform 310 is pliable, allowing the force applied by the first row of rollers 336 and the second row of rollers 338 against skin preform 310 to compress skin preform 310 against mandrel 320 (between the rollers and the mandrel), consolidate the plurality of plies of material (e.g., resin sheets 302 and fiber sheets 301) of skin preform 310, and further conform the geometry of skin preform 310 to that of the mandrel 320.

Heating element 332 and/or heating element 334 may comprise any suitable heating element including infrared heaters, resistive heating elements, or the like. Heating element 332 may be configured to heat a first surface of skin preform 310. Heating element 334 may be configured to heat a second, opposite surface of skin preform 310. Heating element 334 may be configured to heat mandrel 320. Heating element 334 may be configured to stiffener 360 (see FIG. 5).

The first row of rollers 336 may be spring loaded. In this regard, the first row of rollers 336 may comprise at least one spring member 337 (also referred to herein as a first spring member). Similarly, the second row of rollers 338 may be spring loaded. In this regard, the second row of rollers 338 may comprise at least one spring member 339 (also referred to herein as a second spring member). The first spring member 337 and the second spring member 339 bias first row of rollers 336 and second row of rollers 338, respectively, against skin preform 310. As the thermoforming apparatus 330 moves with respect to mandrel 320, the first spring member 337 and the second spring member 339 may extend and/or compress to allow the first row of rollers 336 and second row of rollers 338, respectively, to conform to the geometry of mandrel 320.

FIG. 4A illustrates thermoforming apparatus 330 with dotted lines between step 220 and step 230. FIG. 4A illustrates thermoforming apparatus 330 with solid lines during step 250.

In various embodiments, step 260 may include cooling the skin preform 310 after consolidating and conforming the skin preform 310 to the mandrel 320 to a temperature below a recrystallization temperature of the thermoplastic resin (e.g., room temperature) to form the hardened skin 311 (also referred to herein as a skin). In various embodiments, skin preform 310 is actively cooled. In various embodiments, skin preform 310 is passively cooled.

Figure 4B:
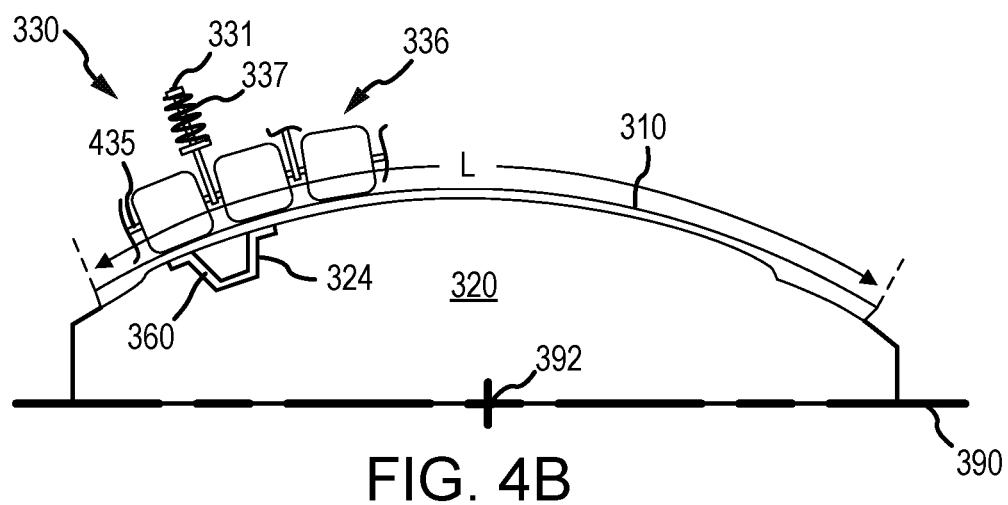
FIG. 4B illustrates a section view of FIG. 4A, illustrating an elongated channel disposed in mandrel 320 and a stiffener formed in said channel and the first row of rollers arranged in an arcuate geometry, in accordance with various embodiments.

With reference to FIG. 4B, a section view of a portion of the thermoforming apparatus 330 and mandrel 320 is illustrated, in accordance with various embodiments. As illustrated in FIG. 4A, skin 311 may be curved along the hoop or circumferential direction (i.e., bent around longitudinal axis 390). Furthermore, skin 311 may be curved along the longitudinal direction (i.e., curved along longitudinal axis 390, or curved about a second axis 392 that is perpendicular to longitudinal axis 390). First row of rollers 336 may extend along the entire length L of skin 310. In this regard, the first row of rollers 336 may be rounded to conform to the geometry of mandrel 320. Stated differently, the axis of rotation of each roller may be non-parallel, or at an angle, with respect to each adjacent roller. In various embodiments, the first row of rollers 336 may comprise a flexible roller system configured to bend with the geometry of mandrel 320. In this regard, the first row of rollers 336 may be mounted on a flexible rod 435. Various systems and methods of configuring a flexible roller system are contemplated herein, including flexible rods, rod segments hingedly coupled to each other, separate axle rods for each roller mounted at an angle with respect to each other to form a rounded row of rollers, etc.

In various embodiments, mandrel 320 may comprise a channel 324 configured and sized to receive a plurality of plies of material (e.g., similar to skin 310 of FIG. 3) to form a stringer or stiffener 360. In this regard, prior to placing skin preform 310 on mandrel 320, a stiffener preform may be placed at least partially into channel 324. As the thermoforming apparatus 330 moves with respect to the mandrel 320, the stiffener 360 may be heated by heating element 334, with momentary reference to FIG. 4A, to a forming temperature and the rollers (i.e., first row of rollers 336 and second row of rollers 338) may press skin preform 310 against stiffener 360 to consolidate the stiffener 360 and the skin preform 310 in a single stage process. In various embodiments, a secondary mandrel may be placed between the stiffener 360 and the skin 310 to help form and shape stiffener 360. In various embodiments, channel 324 may be omitted from mandrel 320 and the skin 311 may be devoid of stiffeners and/or the stiffeners may be bonded to the skin 311 at a later stage.

Stiffener 360 may be coupled to skin 311 to provide reinforcement of the skin 311. Such structural members may include, for example, ribs, spars, or frames configured to be attached to the skin of the fiber-reinforced thermoplastic structure. Such structural members may also include substantially elongated stiffener members often referred to as stringers or stiffeners. The stringers or stiffeners may be formed to exhibit various cross-sectional geometries including configurations such as I-beams, C-shapes or channels, J-shapes, Z-shapes, L-shapes or angles, omega shapes or what is often referred to as a hat shape or a hat channel. A stiffener or stringer exhibiting a cross-sectional geometry or profile of a hat essentially includes a cap member having a pair of web members, one web member extending from each end of the cap member at a defined angle relative thereto, and a pair of flange members with one flange member extending from each web member at a defined angle relative to the associated web member. In the cross-sectional geometry of some hat stiffeners, the flange members may be configured to be substantially parallel with the cap member.

Figure 5:
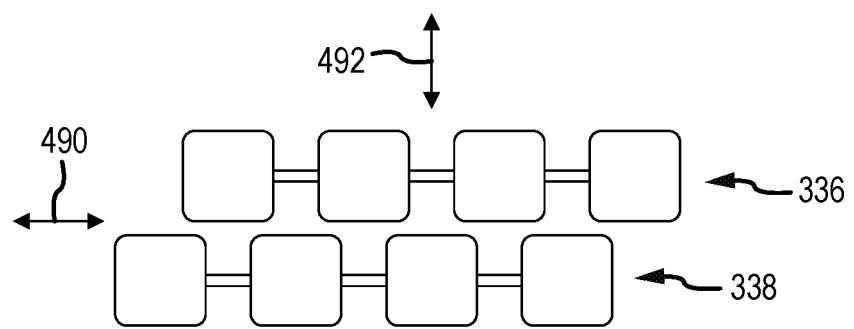
FIG. 5 illustrates a first row of rollers and a second row of rollers offset from the first row of rollers, in accordance with various embodiments.

With reference to FIG. 5, the first row of rollers 336 may be offset from the second row of rollers 338. The first row of rollers 336 may be offset from the second row of rollers 338 in a direction perpendicular, as illustrated by arrow 490, to a direction of travel, illustrated by arrow 492, of the first row of rollers 336 may be offset from the second row of rollers 338. In this manner, each roller of the second row of rollers 338 may be substantially centered between each roller of the first row of rollers 336 to compress the entire surface of the skin 310 (see FIG. 4A), including locations that may be missed due to the spacing or gap between each of the rollers of the first row of rollers 336.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a thermoplastic panel, comprising:
    disposing a second plurality of plies of material comprising thermoplastic resin and fiber to form a stiffener feature in a channel disposed in the mandrel;
    tacking together a plurality of plies of material comprising thermoplastic resin and fiber to form a skin, the plurality of plies of material are tacked together over a substantially planar surface;
    clamping an edge of the skin to a mandrel;
    heating, via a heating element, the skin to a forming temperature;
    heating, via the heating element, the stiffener feature to the forming temperature;
    moving a thermoforming apparatus with respect to the mandrel;
    rolling a first row of rollers of the thermoforming apparatus along the skin in a direction away from the clamped edge of the skin in response to the thermoforming apparatus moving with respect to the mandrel, wherein the first row of rollers comprises a first roller, a second roller, and a third roller; and
    rolling a second row of rollers of the thermoforming apparatus along the skin in the direction away from the clamped edge of the skin in response to the thermoforming apparatus moving with respect to the mandrel, wherein the first row of rollers is offset from the second row of rollers, wherein the second row of rollers comprises a fourth roller, a fifth roller, and a sixth roller, wherein the fourth roller is substantially centered between the first roller and the second roller, and wherein the fifth roller is substantially centered between the second roller and the third roller;
    in response to the first row of rollers and the second row of rollers of the thermoforming apparatus rolling along the skin, compressing the skin between the mandrel and the first row of rollers and the second roll of rollers, consolidating the plurality of plies of material, and bending the skin to conform to a shape of the mandrel;
    compressing, via the first row of rollers and the second row of rollers, the stiffener feature between the skin and the mandrel in response to the first row of rollers and the second row of rollers of the thermoforming apparatus being rolled along the skin, wherein the stiffener feature and the skin are consolidated together in response to being compressed by the first row of rollers and the second row of rollers; and
    cooling the skin after consolidating and conforming the skin to the mandrel to a temperature below a recrystallization temperature of the thermoplastic resin.

2. The method of claim 1, wherein the forming temperature is greater than at least one of a recrystallization temperature and a glass transition temperature of the thermoplastic resin.

3. The method of claim 1, wherein the first row of rollers, the second row of rollers, and the heating element are coupled to the thermoforming apparatus, and wherein the first row of rollers and the second row of rollers and the heating element move together with the thermoforming apparatus.

4. The method of claim 1, wherein the thermoforming apparatus is moved along a track system with respect to the mandrel.

5. The method of claim 1, wherein, in response to the thermoforming apparatus moving with respect to the mandrel, a trajectory of the thermoforming apparatus conforms to the shape of the mandrel.

6. The method of claim 1, wherein the first row of rollers, the second row of rollers, is compressed against the skin via a spring member.

7. A method for forming a thermoplastic panel, comprising:
- coupling an edge of a skin to a mandrel exhibiting a substantially convex geometry, the skin comprises a plurality of plies of material;
- heating, via a first heating element, the skin to a forming temperature;
- moving a thermoforming apparatus with respect to the mandrel;
- rolling a first row of rollers of the thermoforming apparatus along the skin in a direction away from the clamped edge of the skin in response to the thermoforming apparatus moving with respect to the mandrel, wherein the first row of rollers comprises a first roller, a second roller, and a third roller;
- rolling a second row of rollers of the thermoforming apparatus along the skin in the direction away from the clamped edge of the skin in response to the thermoforming apparatus moving with respect to the mandrel, wherein the first row of rollers is offset from the second row of rollers, wherein the second row of rollers comprises a fourth roller, a fifth roller, and a sixth roller, wherein the fourth roller is substantially centered between the first roller and the second roller, and wherein the fifth roller is substantially centered between the second roller and the third roller;
- compressing, via a first spring member, the skin between the first row of rollers and the mandrel in response to the thermoforming apparatus moving with respect to the mandrel, thereby consolidating the plurality of plies of material and causing the skin to conform to a shape of the mandrel;
- compressing, via a second spring member, the skin between the second row of rollers and the mandrel in response to the thermoforming apparatus moving with respect to the mandrel, thereby consolidating the plurality of plies of material and causing the skin to conform to the shape of the mandrel; and
- cooling the skin after consolidating and conforming the skin to the mandrel to a temperature below a recrystallization temperature.

8. The method of claim 7, further comprising disposing a second plurality of plies of material in a channel disposed in the mandrel to form a stiffener feature.

9. The method of claim 8, further comprising heating, via at least one of the first heating element and a second heating element, the stiffener feature to the forming temperature.

10. The method of claim 9, further comprising:
- compressing, via the first spring member, the stiffener feature between the first row of rollers and the mandrel in response to the thermoforming apparatus moving with respect to the mandrel, thereby consolidating the second plurality of plies of material of the stiffener feature and causing the stiffener feature to conform to the shape of the channel;
- compressing, via the second spring member, the stiffener feature between the second row of rollers and the mandrel in response to the thermoforming apparatus moving with respect to the mandrel, thereby consolidating the second plurality of plies of material of stiffener feature and causing the stiffener feature to conform to the shape of the channel; and
- cooling the stiffener feature after consolidating and conforming the stiffener feature to the mandrel to the temperature below the recrystallization temperature, wherein the stiffener feature and the skin are consolidated together in response to being compressed by the first row of rollers and the second row of rollers.

* * * * *